3,301,277
PLASTIC-LINED CONDUIT
Harold S. Kelly, Bartlesville, Okla., assignor to Phillips
Petroleum Company, a corporation of Delaware
Filed Oct. 18, 1963, Ser. No. 317,257
7 Claims. (Cl. 138—114)

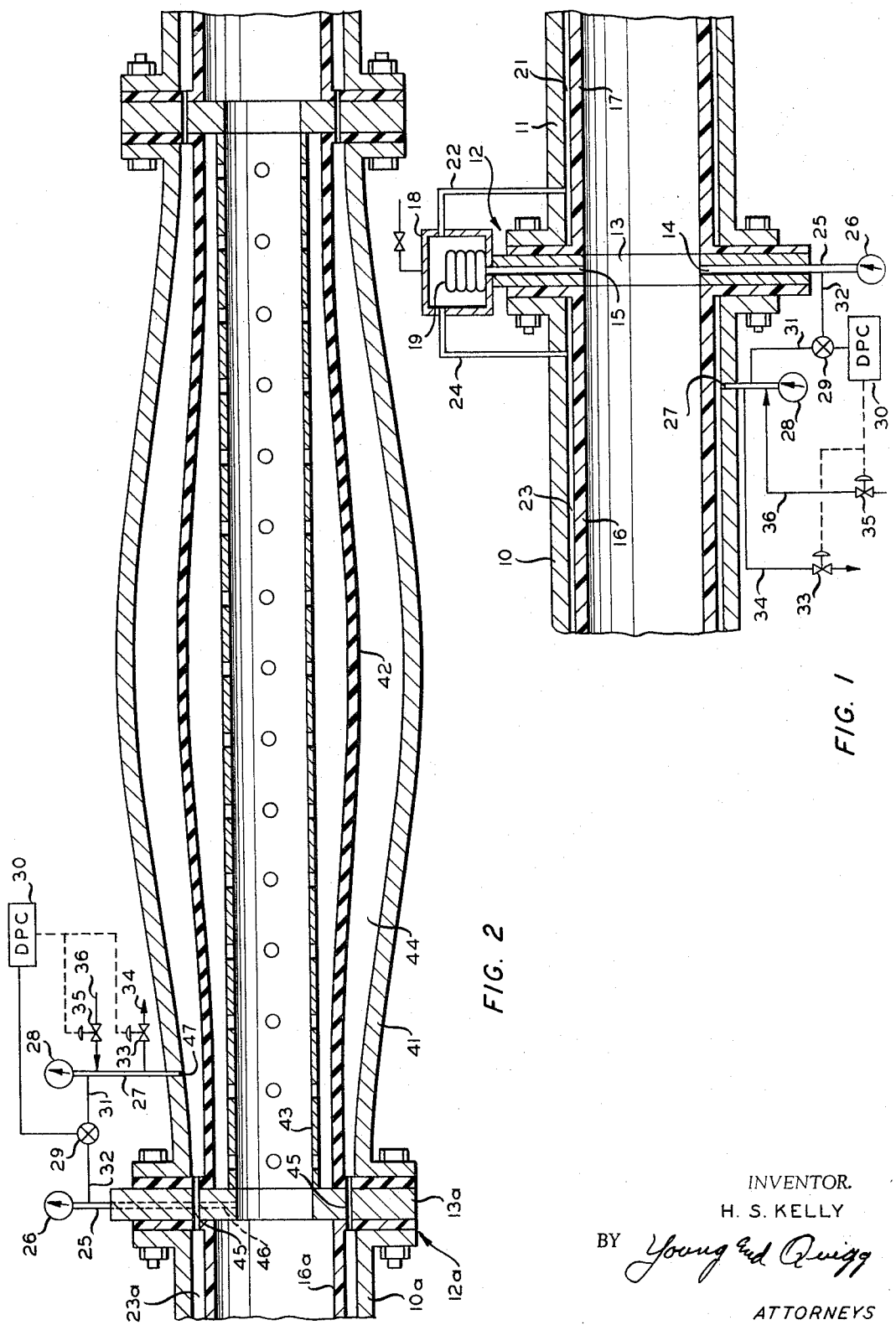

This invention relates to pressure-resistant conduits lined with thermoplastic conduits of smaller diameter so that an annulus exists between the two coaxial conduits. In one aspect the invention relates to means for equalizing the pressure on the inside and on the outside of a thermoplastic lining in a pressure-resistant conduit so that the conduit can be used for transporting fluids at pressures considerably higher than the working pressure of the plastic conduit which forms the liner. In another aspect the invention relates to means for installing a thermoplastic liner in a conduit without the necessity of removing the pressure-resistant conduit from its position. In still another aspect the invention relates to means for converting a pressure-resistant conduit, susceptible of corrosion, from non-corrosive use to corrosive use without the necessity of removing the conduit from its position.

It is known to install thermoplastic liners in pressure-resistant conduits to protect the pressure-resistant conduit from corrosive effects of materials being transported through the conduit. These known methods, however, have been limited to filling the annulus between the thermoplastic liner and the pressure-resistant conduit with a solid material such as hydraulic cement or a gelled liquid to protect the thermoplastic liner from the pressure of the fluid being transported because such pressures are often in excess of the normal working pressure of the plastic liner. Alternatively, it has been proposed to employ a close-fitting thermoplastic liner so that the pressure of the fluid being transported will expand the liner out against the pressure-resistant conduit. This later proposal presupposes that the thermoplastic liner will not be adversely affected by such a slight amount of expansion. The above methods are adequate where the conduit is readily accessible or where an initial installation is being accomplished but these methods are not applicable to the installation of a liner in a long stretch of conduit, for example, a buried pipe line which can be several thousand feet in length.

The present invention is directed to means for installing a thermoplastic liner in a conduit of considerable length in an inaccessible location, for example, a buried pipe line for transporting oil from the well head to a storage location. The invention contemplates installing a thermoplastic liner of considerably smaller diameter than that of the pipe line so that the liner can be forced through a great length of buried pipe line or through pipes or other conduits containing impediments such as deposits, bends, valves and the like. The present invention further contemplates balancing the pressure in the annulus between the pipe line and the liner with the pressure inside the liner so that the liner can transport fluid through the pipe line at pressures higher than the normal working pressure of the liner without subjecting the liner to a differential pressure greater than its normal working pressure.

It is therefore a principal object of this invention to provide means for lining a pressure-resistant conduit with a thermoplastic liner so that the pressure on the outside of the liner is balanced with the pressure on the inside of the liner. Another object of the invention is to provide means for placing a liner in a conduit of great length which is in an inaccessible location and protecting the liner from the internal pressure to which the conduit is normally subjected. Still another object of the invention is to provide means for balancing the pressure in the annulus between a pressure-resistant conduit and its thermoplastic liner. Further objects and advantages of the invention will be apparent to those skilled in the art upon studying this disclosure including the detailed description of the invention and the appended drawing wherein:

FIGURE 1 is a cross sectional elevation of one embodiment of the invention; and

FIGURE 2 is a cross sectional elevation of a modification of the invention shown in FIGURE 1.

Referring now to FIGURE 1, section of steel conduit 10 is secured to an adjoining section of steel conduit 11 by means of a bolted flange connection 12 containing a stainless steel ring 13 having openings indicated at 14 and 15 to provide access to the interior of the thermoplastic lining composed of sections 16 and 17. A metal surge pot 18 containing a stainless steel bellows 19 is connected to the opening 15 in ring 13 so that the interior of the thermoplastic liner 16–17 is connected to the interior of the bellows 19. The interior of the surge pot 18 outside the bellows 19 is connected to the annulus 21 between steel conduit section 11 and thermoplastic liner 17 by means of conduit 22 and the annulus 23 between steel conduit section 10 and thermoplastic liner section 16 is similarly connected to the interior of the surge pot 18 outside the bellows 19 by conduit 24.

Opening 14 in ring 13 is connected by means of a conduit 25 to pressure-sensing device 26 which can be a pressure indicator of a pressure recorder, as desired, so as to provide a measurement of the pressure within the thermoplastic liner 16–17. The annulus between the steel pipe and thermoplastic liner is connected by means of conduit 27 to pressure-sensing device 28 which, similarly, can be a pressure indicator or a pressure recorder to provide a measurement of the pressure in the annulus. Conduits 25 and 27 are connected by means of conduits 31 and 32, respectively, to a differential pressure transmitter (DPT) 29 which senses the pressure in conduits 25 and 27 and transmits a signal proportional to the differential pressure to differential pressure controller 30. Control valve 33 communicates with conduit 27 by means of conduit 34 and control valve 35 communicates with conduit 27 by means of conduit 36. Control valves 33 and 35 are operatively connected with differential pressure controller (DPC) 30 so that pressure is vented from the annulus via conduits 27, conduit 34 and valve 33 when the pressure in the annulus is a predetermined amount greater than the pressure in the liner and so that fluid is added to the annulus via valve 35, conduit 36 and conduit 27 when the pressure in the annulus is a predetermined amount below the pressure in the liner.

A modification of the pressure balancing device of FIGURE 1 is shown in FIGURE 2 wherein the surge pot corresponding to surge pot 18 of FIGURE 1 is an integral part of the pipe line. Conduit section 10a containing thermoplastic liner section 16a is connected by flange connection 12a containing ring 13a to enlarged conduit section 41 containing rubber sleeve 42. A perforated metal tube 43 is secured to ring 13a to prevent collapse of rubber sleeve 42. The annulus 23a between steel conduit 10a and thermoplastic liner 16a is connected to the annulus 44 between metal conduit 41 and rubber sleeve 42 by means of openings 45.

The pressure-balancing system of FIGURE 1 is applicable to the modification of FIGURE 2. Conduit 25 is in communication with the interior of the liner by means of opening 46 and conduit 27 is in communication with the annulus 23a–44 by means of opening 47 in conduit section 41.

A specific embodiment of the invention will now be described as applied to an oil well which has been producing oil and is now producing a mixture of oil and salt water so that the buried lead line leading the fluid from the well to the tank battery must be protected from the corrosive action of the salt water to prevent failure of the lead line. The lead line is a standard four-inch steel pipe line about 1000 feet in length. The line is opened at each end and a "pig" with a steel line attached is forced through the lead line by hydraulic pressure. The steel line is then attached to a section of 2⅜-inch O.D., 2⅛-inch I.D. thermoplastic tubing and the tubing is pulled into the lead line. Additional sections of tubing are fused to the tubing as it is pulled into the lead line until a continuous thermoplastic liner is formed in the lead line. A thermoplastic flange is fused to each end of the liner. One end of the lead line is connected to the well by means of a section of lined conduit and a flanged system as shown in FIGURE 1 and the other end of the lead line is connected to the tank battery by a similar system.

The thermoplastic liner is made of a copolymer of ethylene and 1-butene (2.5 weight percent 1-butene), containing 2.5 weight percent carbon black and having the following properties:

| | Gms./cc. |
|---|---|
| Density ASTM, D1505–57T | 0.958 |
| Melt Index ASTM, D1238–57T | 0.3 |

The fluid pressure at the well head is about 200 to 250 p.s.i. at about 80° F. The allowable working pressure of the thermoplastic liner at 80° F. is about 70 p.s.i. The fluid used to provide equalizing or balancing pressure in the annulus between the lead line and the liner is kerosene supplied from a tank pressured by compressed air because kerosene and compressed air are available at the site and are inexpensive.

The differential pressure transmitter (DPT) 29 and the differential pressure controller (DPC) 30 are operated by instrument air at 20 p.s.i. and the DPC is set to operate over a range of 3 to 15 p.s.i. proportional to a range of 50 p.s.i. in the annulus in excess of the liner pressure to 50 p.s.i. in the liner in excess of the annulus pressure. Thus a signal of 9 p.s.i. from the DPT to the DPC will indicate no pressure differential and both valves 33 and 35 will be closed. In order to avoid unnecessary operation of valves 33 and 35, a dead zone is established between an output from the DPT of 8 to 10 p.s.i. When the output signal from the DPT drops below 8 p.s.i., valve 35 begins to open to supply kerosene to annulus and valve 35 is wide open at a signal of 3 p.s.i. When the output signal from the DPT rises above 10 p.s.i. valve 33 begins to open to vent kerosene from the annulus and valve 33 is wide open at a signal of 15 p.s.i.

It is preferred that a liquid be employed as the fluid in the annulus because the volume of fluid required to be added to, or withdrawn from, the annulus to compensate for changes in the pressure within the liner is much smaller when a liquid is employed. In systems wherein the pressure in the liner is substantially constant a gas can often be used advantageously. The fluid should, in any event, be inert to the conduit and the liner. Liquid hydrocarbons such as kerosene, gasoline, naphtha, gas oil, crude oil, and the like, are preferred because they are inert to the conduit and liner and are usually available at or near the site.

The conduit in which the thermoplastic liner is inserted will usually be fabricated from metal, e.g., steel pipe; however, the invention is not limited to metal conduit because any pressure-resistant conduit can be utilized according to the invention.

Thermoplastic materials in general are applicable for fabricating the thermoplastic liners of the invention; however, a particularly preferred class of materials is that of solid linear polymers of 1-olefins including solid linear homopolymers of ethylene and propylene and solid copolymers of ethylene and higher 1-olefins such as copolymers of ethylene and propylene and copolymers of ethylene and 1-butene prepared by low-pressure polymerization in the presence of an organic diluent and a solid catalyst. Such homopolymers and copolymers can be prepared by the method described in U.S. Patent 2,825,-721, issued March 4, 1958, to J. P. Hogan et al.

That which is claimed is:

1. The method of protecting a pressure-resistant conduit from the corrosive action of a fluid passed therethrough which comprises placing a corrosion-resistant plastic liner in said conduit; filling the annulus between the liner and conduit with a noncorrosive fluid; passing corrosive fluid through said liner; connecting the fluid in the annulus to one side of a flexible, impermeable membrane in an enclosed zone; and connecting the fluid in the liner to the other side of said membrane in said zone.

2. The method of protecting a pressure-resistant conduit from a corrosive fluid passed therethrough which comprises placing a corrosion-resistant plastic liner in said conduit; passing corrosive fluid through said liner; filling the annulus between the liner and conduit with a noncorrosive fluid; connecting the fluid in the annulus to one side of an enclosed zone divided by a flexible, impermeable membrane; connecting the fluid in the liner to the other side of said zone; sensing differential pressure between the annulus and liner; adding fluid to the annulus when the pressure in the liner exceeds the pressure in the annulus a predetermined amount; and venting fluid from said annulus when the pressure in the annulus exceeds the pressure in the liner a predetermined amount.

3. The method of protecting a buried steel pipe line from the corrosive action of salt water in the fluids passed through the pipe line which comprises inserting a fluid impervious, rigid, thermoplastic liner in said pipe line; sealing the ends of the liner so as to exclude contact of the fluids in the liner with the steel pipe line; filling the annulus between the liner and the steel pipe line with a liquid hydrocarbon; passing fluids containing salt water through said liner; sensing the pressures in the annulus and in the liner; and maintaining the differential pressure between the liner and the annulus within the normal working pressure of the liner.

4. A conduit assembly comprising a pressure-resistant conduit; a plastic liner positioned in said conduit so as to provide an annulus between said conduit and said liner; a vessel separated into two fluid-tight chambers by a flexible membrane; fluid passage means connecting said annulus and one of said chambers; fluid passage means connecting the interior of said liner and the other said chamber; a fluid substantially filling said annulus; and a fluid substantially filling said liner.

5. A conduit assembly comprising a pressure-resistant conduit; a plastic liner positioned in said conduit so as to provide an annulus between said conduit and said liner; a closed vessel separated into two chambers by a flexible membrane; fluid passage means connecting said annulus and one of said chambers; fluid passage means connecting the interior of said liner and the other said chamber; means to vent fluid from said annulus; means to add fluid to said annulus; control means operatively connected to said means to vent fluid from and means to add fluid to said annulus adjusted so as to vent fluid from said annulus when the pressure in the annulus rises to a predetermined level above the pressure in the liner and to add fluid to the annulus when the pressure in the annulus falls to a predetermined level below the pressure in the liner; and means to sense the pressure in the annulus and in the liner and to transmit a signal proportional to the differential pressure to said control means.

6. A pipe line assembly comprising a buried steel pipe line; a liner comprising a solid linear polymer of a 1-olefin positioned in said pipe line so as to provide an annulus between said liner and said pipe line; a liquid hydrocarbon substantially filling said annulus; a liquid substantially filling said liner; a closed vessel separated into a first chamber and a second chamber by a flexible diaphragm; means providing communication between the liquid in the annulus and said first chamber; means providing communication between the liquid in the liner and said second chamber; differential pressure-transmitting means to sense the pressure in the annulus and the pressure in the liner and to provide a signal proportional to the differential pressure in the annulus and in the liner; a supply of liquid hydrocarbon; and control means operatively connected to said differential pressure-transmitting means, said supply of hydrocarbon and said annulus to supply liquid to said annulus when the pressure in the annulus falls a predetermined amount below the pressure in the liner and to withdraw liquid from the annulus when the pressure in the annulus rises a predetermined amount above the pressure in the liner.

7. The pipe line assembly of claim 6 wherein the means providing communication between the liquid in the liner and said second chamber comprises a stainless steel ring positioned between two bolted flanges connecting adjacent sections of said pipe line wherein adjacent ends of sections of said liner are turned outwardly so as to be engaged between one of said flanges and said ring; and a passageway communicating between the interior of the liner and the interior of said second chamber.

References Cited by the Examiner

UNITED STATES PATENTS

| | | | |
|---|---|---|---|
| 2,690,806 | 10/1954 | Britton et al. | 138—148 X |
| 2,712,831 | 7/1955 | Day | 138—26 |
| 2,949,932 | 8/1960 | Hewitt | 138—30 X |
| 3,103,234 | 9/1963 | Washburn | 138—30 |

FOREIGN PATENTS 1,143,064  1/1963  Germany.

LAVERNE D. GEIGER, *Primary Examiner.*

C. HOUCK, *Assistant Examiner.*